(12) United States Patent
Lohmar

(10) Patent No.: US 12,263,949 B2
(45) Date of Patent: Apr. 1, 2025

(54) AIR DISTRIBUTION SYSTEM FOR A CABIN OF AN AIRCRAFT

(71) Applicant: Airbus Operations GmbH, Hamburg (DE)

(72) Inventor: Jens Lohmar, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 446 days.

(21) Appl. No.: 17/586,356

(22) Filed: Jan. 27, 2022

(65) Prior Publication Data

US 2022/0242578 A1 Aug. 4, 2022

(30) Foreign Application Priority Data

Jan. 29, 2021 (DE) ................... 10 2021 102 132.4

(51) Int. Cl.
*B64D 13/06* (2006.01)
*B64D 11/00* (2006.01)

(52) U.S. Cl.
CPC .............. *B64D 13/06* (2013.01); *B64D 11/00* (2013.01); *B64D 2013/0603* (2013.01)

(58) Field of Classification Search
CPC .............................. B64D 13/06; B64D 11/00; B64D 2013/0603; B64D 2013/0625; B60H 1/00295
USPC .......................................................... 454/76
See application file for complete search history.

(56) References Cited

U.S. PATENT DOCUMENTS

| | | | |
|---|---|---|---|
| 2008/0308674 A1* | 12/2008 | Frantz | B29C 66/54 138/128 |
| 2011/0024565 A1* | 2/2011 | Koefinger | B64C 1/068 244/131 |
| 2011/0108150 A1* | 5/2011 | Renaud | F02M 35/10144 24/457 |
| 2012/0074258 A1* | 3/2012 | Papke | B64D 11/003 244/118.5 |

(Continued)

FOREIGN PATENT DOCUMENTS

DE 12 17 708 B 5/1966
DE 102019116956 A1 12/2020

(Continued)

OTHER PUBLICATIONS

German Search Report for Application No. 102021102132 dated Dec. 13, 2021.

(Continued)

*Primary Examiner* — Steven B McAllister
*Assistant Examiner* — Charles R Brawner
(74) *Attorney, Agent, or Firm* — KDW Firm PLLC

(57) ABSTRACT

An air distribution system for a cabin of an aircraft includes a supply air line with a supply air line connector, at least one air outlet with an air outlet connector, a riser line, which is connectable to the supply air line connector and the air outlet connector, and a trim element to be arranged on a primary structure of the aircraft inside the cabin. The riser line is flexible, wherein the trim element has an outer side which can be oriented relative to the primary structure and on which there is at least one retainer for retaining the riser line, and the at least one retainer is designed to be interlockingly connected to the riser line by being pressed against the latter, such that the riser line is fixed.

14 Claims, 3 Drawing Sheets

(56) References Cited

U.S. PATENT DOCUMENTS

| | | | |
|---|---|---|---|
| 2012/0145828 A1* | 6/2012 | Grosse-Plankermann | ................... B64F 5/10 29/700 |
| 2013/0160472 A1* | 6/2013 | Klimpel | ................. B64D 13/08 62/401 |
| 2014/0061395 A1* | 3/2014 | Allivato, Sr. | ....... F24F 13/0254 248/74.1 |
| 2014/0273787 A1* | 9/2014 | McCammon | .......... B21D 53/92 454/76 |
| 2021/0348798 A1* | 11/2021 | Perry | ................... F24F 13/084 |

FOREIGN PATENT DOCUMENTS

| | | |
|---|---|---|
| DE | 102019116959 A1 | 12/2020 |
| EP | 0 852 680 B1 | 7/1999 |

OTHER PUBLICATIONS

Aus Anderstorp Schwed, "Und Verbindungstechnik Katalog", Norma Sweden AB, Jan. 12, 2017.

* cited by examiner

AIR DISTRIBUTION SYSTEM FOR A CABIN OF AN AIRCRAFT

CROSS-REFERENCE TO RELATED APPLICATION

This application claims priority to German Patent Application No. 10 2021 102 132.4 filed Jan. 29, 2021, the entire disclosure of which is incorporated by reference herein.

TECHNICAL FIELD

The disclosure herein relates to an air distribution system for a cabin of an aircraft, to an aircraft, and to a method for fitting an air distribution system in a cabin of an aircraft.

BACKGROUND

The cabin of an aircraft is usually air-conditioned by an integrated air-conditioning system both during flight operation and during ground operation. For example, this air-conditioning system is supplied with bleed air, which is drawn from compressors of engines or auxiliary engines. Air-conditioning units cool this air to a desired temperature and feed it to a mixer unit, in which it is mixed with recirculation air drawn from the cabin. The resultant mixed air is supplied via an air distribution system to a plurality of air outlets within the cabin.

Since the mixer unit is typically arranged in the lower deck region, in particular in the region of the wing box, mixed air is firstly conducted to the front and rear via lines running along the longitudinal axis and passes via riser lines into the cabin in the upper deck of the aircraft, where the lines open out into the air outlets. Air outlet openings are typically arranged above passenger seat positions and are therefore formed, for example, on ceiling trim panels for the cabin.

It is known to supply pairings of a side air outlet and an upper air outlet by riser lines. Both the riser lines and the air outlets are usually fabricated from a solid material, generally from composite materials. The pipes made of composite materials are limited in their overall length, on the one hand for strength reasons, but on the other hand also due to the tolerances present, which have to be taken into consideration for installation. Individual pipe parts are connected by sleeves which are designed such that they can compensate for manufacturing tolerances. Each pipe is mounted separately on the aircraft structure and must maintain a minimum spacing in order to prevent component parts from being damaged by relative movements. The riser lines and the air outlets are provided in part with an insulation layer in order to limit the heat exchange between the surroundings and preconditioned air which is conveyed to the cabin. This insulation is ensured in part by the surrounding primary and secondary insulation. A further function of the insulation is that of avoiding condensation water on the outer side of the piping.

During the production of the aircraft, riser lines and side air outlets are often installed during the fuselage section assembly, once primary insulation mats have been assembled. Metal clips are usually used for this purpose. The lower end of the riser lines is connected to a hose on a longitudinal-side air supply in the underfloor region. During final assembly, side cabin trims are installed, which hide the system fittings, riser lines therebeneath, and air outlets. An insulating mat is also fastened to the rear side of the side cabin trim and forms what is known as the secondary insulation.

There is little installation space available between the aircraft structure and the cabin trim, in particular in the region of cabin windows.

SUMMARY

An object of the subject matter herein is to disclose an alternative fastening concept for riser pipes, by which in particular the complexity of the fastening process is reduced, although sufficient tolerance compensation can still be provided, and the process of final assembly is not hindered or delayed.

The object is achieved by an air distribution system disclosed herein. Advantageous embodiments and refinements are disclosed in the following description.

An air distribution system for a cabin of an aircraft is disclosed, comprising a supply air line with a supply air line connector, at least one air outlet with an air outlet connector, a riser line, which is connectable to the supply air line connector and the air outlet connector, and a trim element to be arranged on a primary structure of the aircraft inside the cabin, wherein the riser line is flexible, wherein the trim element has an outer side which can be oriented relative to the primary structure and on which there is arranged at least one retainer for retaining the riser line, and wherein the at least one retainer is designed to be interlockingly connected to the riser line by being pressed against the latter, such that the riser line is fixed.

The air distribution system, as in the prior art, is based on the combination of supply air lines and air outlets which are connectable to one of the supply air lines by riser lines. The at least one air outlet can comprise, for example, a side air outlet and an upper air outlet. When arranging the system in a cabin of an aircraft it is conceivable that each side of the cabin is fitted in the longitudinal direction with a plurality of side and upper air outlets. Furthermore, the fitting out of the cabin is preferably symmetrical, so that a plurality of side air outlets and upper air outlets are installable on both longitudinal sides.

The trim element serves to line part of a primary structure of the aircraft and the fittings arranged thereon. In particular, it can extend from a plinth panel to an overhead storage compartment. A trim element of this kind is usually one of the last components to be mounted during the final assembly of an aircraft when fitting out a cabin.

In accordance with the disclosure herein, the riser line is flexible. Consequently, it should not be compared to a rigid pipeline, which when fitting out the aircraft is arranged on the primary structure by a plurality of retainers and the length of which has to be adjusted by one or more sleeves. Rather, the riser line according to the disclosure herein is flexible and expandable and compressible at least in moderation. In addition, the riser line can be connected to the supply air line connector and the air outlet connector already before being fastened in place, so as to be able to carry out a test run of the air distribution system. A connection sufficient for the test run is provided only by the arrangement of the riser line at the relevant supply air line connector and the outlet air connector. The installation therefore occurs at an earlier time during the fitting-out process, before installation of the cabin trim. Potential installation errors therefore can be easily and quickly remedied during a test run on account of the free accessibility.

At least one retainer is arranged on the trim element, on the outer side thereof. The outer side, during use, faces the primary structure, whereas the inner side protrudes into the cabin. The installation of the trim element comprises the fastening of the trim element to the primary structure or to means arranged thereon, as will be described further below. Due to the interlocking engagement with the retainer, the riser line, after installation of the trim element, is consequently also fastened to the primary structure or to the means arranged thereon. There is no need for complex assembly of the riser line or complex connection of the riser line following installation of a trim element. With a sufficient freedom of movement as a result of suitable material selection, the riser line can also be fastened to the outer side of the trim element prior to the actual installation of the trim element on the primary structure.

In an advantageous embodiment, the riser line is formed as a hose, in particular as a spiral hose. The hose is preferably embodied in such a way that it expands minimally in the radial direction when supplied with an air flow. A spiral hose, for example, could have a spiraled reinforcement arranged on the outer side of the hose over the length of the hose, which reinforcement gives the hose a particular tensile strength in the circumferential direction.

Furthermore, the trim element could be a wall panel for installation in an inter-former area of the cabin. The trim element could correspond accordingly to a conventional trim element for a passenger cabin of an aircraft. An inter-former area is considered to be a lateral region of the fuselage skin between two successive formers. The inter-former area could extend over one or two cabin windows. The trim element can comprise one or more cut-outs for cabin windows.

The trim element can furthermore comprise, at a lower edge and upper edge, first fastener, connectable to second fastener. The second fastener could be arranged on an upper cabin module and on a lower cabin module.

The trim element preferably has two or more retainer for a riser line which are distanced from one another vertically. Each riser line behind the relevant trim element is fixed with two or more means. The retention of the riser line, in particular in the embodiment as a hose, is thus improved.

It is advantageous if the trim element comprises a retainer for retaining a plurality of riser lines. Accordingly, two or more riser lines, which for example are spaced from one another in the longitudinal direction of a cabin, can also run behind a trim element. It is conceivable that two riser lines are arranged at mutually opposite end regions of the trim element. Each of these riser lines can also be fastened by a plurality of retainers spaced from one another vertically.

Furthermore, the retainer could comprise at least one bracket element, which defines a contour corresponding substantially to an arc with an angle subtended by the arc of more than 180°, and wherein the bracket element is flexible to such an extent that, by pressing the bracket element onto the riser line, a cross section of the riser line is engaged over more than 180°. The bracket element could therefore correspond at least in some regions to a ring, a part of which is removed. The remaining part can correspond substantially to an arc with an angle subtended by the arc of more than 180°. In a relaxed state, the bracket element can thus be brought into contact with a riser line so that free ends of the bracket element touch an outer surface of the riser line. By pressing further, the bracket element is slightly widened, so that the two ends are spaced from one another. By continuing to move the bracket element towards the riser line, the bracket element can then engage around the riser line, so that the ends, with full contact between the bracket element and the riser line, move towards one another again and the bracket element assumes the relaxed state again. The riser line is thus interlockingly connected to the retainer. The material of the bracket element is particularly preferably resilient in this case.

The riser line, in an advantageous embodiment, is connected to the air outlet connector and has, at an end remote from the air outlet connector, a connection piece which is connectable to the supply air line connector, which is formed in a complementary manner. The riser line could be connected to the air outlet connector already prior to installation of the air outlet. After installation, the hose for the riser line can hang down from the air outlet connector or can be attached thereto, in order to then make a connection to the supply air line connector.

In an advantageous embodiment, the at least one air outlet is arranged on a preassembled ceiling module for integration in the cabin. The ceiling module could comprise a plurality of amenities, for example a storage compartment, a shelf, control devices, etc. The at least one air outlet can be integrated into the ceiling module already prior to the installation of the latter. The entire ceiling module could consequently be attached in preassembled form to provided fastenings of the primary structure. The effort required for assembly of the riser lines is thus particularly small. It is conceivable that the ceiling module, on an underside, comprises two fasteners which are connectable to first fastener of the trim element.

In a further advantageous embodiment, the supply air line is arranged on a preassembled floor module for integration in the cabin. Similarly to the ceiling module, the floor module can also be correspondingly preassembled, before it is introduced into the cabin. The floor module could comprise two fasteners which are connectable to first fastener of the trim element.

In an advantageous embodiment, the retainer is an active retainer, which is designed, by application of a voltage, to assume an open state in which the riser line is no longer fixed. In order to perform maintenance work on the aircraft, it is expedient to design the trim element such that this can be disassembled without having to first remove passenger seats. However, it cannot be guaranteed that all retainers are accessible by hand on the rear side for detachment from the riser line. It is conceivable to fit the retainer(s) with active elements so that the retainer(s) are detachable selectively by application of a voltage. The retainer(s) can be connected to a wire or a line which leads to a connector. The connector could lie on the outer side of the trim element in an edge region. During maintenance, a voltage could be applied to this connector so that the retainer(s) connected to the connector are detached. The active elements could be realized by EAP (electrically activated polymers) or SMA (shape memory alloys).

The disclosure herein also relates to an aircraft comprising a primary structure, a cabin formed therein, an air-conditioning system installed in the aircraft, and at least one air distribution system according to the above description. The air-conditioning system is coupled to the air distribution system via a mixer unit and recirculation lines. The design of the air-conditioning system, however, is not essential to the core concept of the disclosure herein.

In an advantageous embodiment, a plurality of modules, which have been explained above, are arranged adjacently in a ceiling region of the cabin and/or a plurality of floor modules, which have been explained above, are arranged adjacently in or beneath a floor. Consequently, the entire cabin can be fitted with floor modules and/or ceiling modules which are introduced preassembled into the cabin of the aircraft.

The disclosure herein relates to a method for fitting an air distribution system in the cabin of an aircraft, having the steps of installing a supply air line having a supply air line connector, installing at least one air outlet having an air outlet connector, connecting a flexible riser line to the air outlet connector and the supply air line connector, and attaching a trim element to a primary structure of the aircraft within the cabin, wherein the riser line is fixed interlockingly by at least one retainer to an outer side of the trim element facing the primary structure.

In an advantageous embodiment, the installation of the supply air line is performed by installing a floor module in or beneath a floor.

Similarly, the installation of the at least one air outlet is performed by installing a ceiling module in a ceiling region.

In addition, the flexible riser line can be connected to the air outlet connector prior to the installation of the at least one air outlet. In particular with the use of a ceiling module, the riser line can be preassembled prior to the installation of the ceiling module.

BRIEF DESCRIPTION OF THE DRAWINGS

Further features, advantages and potential applications of the disclosure herein will become clear from the following description of the example embodiments and the drawings. Here, all features described and/or shown in the drawings form the subject matter of the disclosure herein in isolation and in any combination, also independently of their arrangement in the individual claims or dependency references of the claims. In the drawings, furthermore, like reference signs are used for like or similar objects.

DETAILED DESCRIPTION

Figure 1:
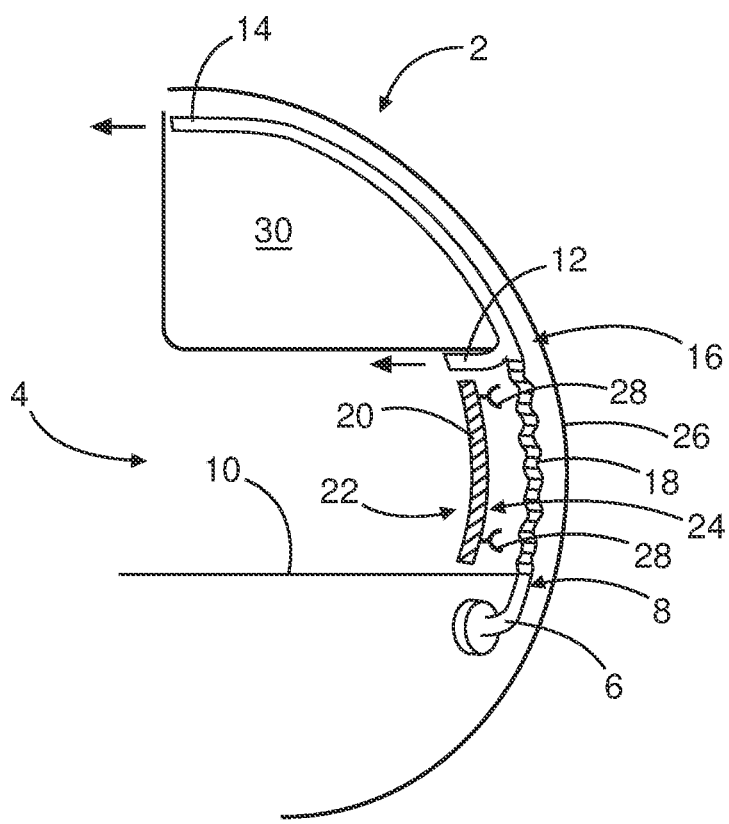
FIG. 1 shows a schematic sectional illustration of a system according to the disclosure herein.

FIG. 1 shows an air distribution system 2, which is installed in a cabin 4 of an aircraft. The air distribution system 2 comprises a supply air line 6 with a supply air line connector 8. The supply air line 6 runs beneath a cabin floor 10, wherein the supply air line connector 8 is arranged in the region of the cabin floor 10. Furthermore, two air outlets 12 and 14 are shown by way of example and conduct air into the cabin 4. Two air outlets 12 and 14 have an air outlet connector 16, which is connected via a riser line 18 to the supply air line connector 8. The riser line 18 is formed here as a flexible hose.

A trim element 20 is provided, which has an inner side 22 and an outer side 24. The outer side 24 is directed to a primary structure 26 of the aircraft and, by way of example, has two retainers 28. These are designed to engage the riser line 18 interlockingly and to hereby fix the riser line.

The air outlet connector 16 and the air outlets 12 and 14 are arranged on a ceiling module 30, which is a preassembled unit for integration in the cabin 4. The trim element 20 can run between the cabin floor 10 and the ceiling module 30 and can be fastened thereto. The riser line 18 is fixed by the retainers 28, and therefore it does not have to be fastened to the primary structure 26 using dedicated retainers.

Figure 2:
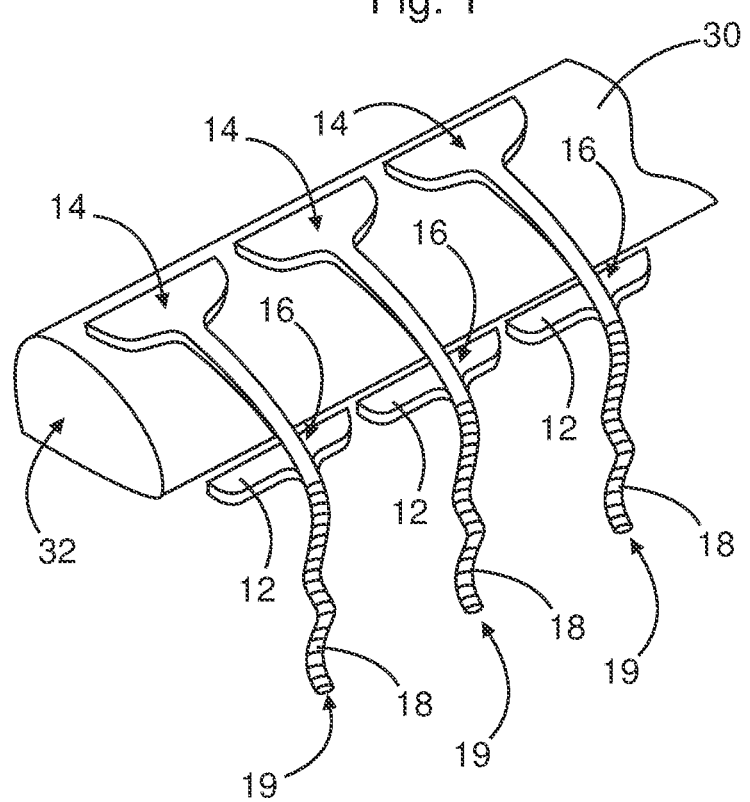
FIG. 2 shows a ceiling module.

FIG. 2 shows the ceiling module 30 in a perspective illustration. Here, by way of example, a storage compartment assembly 32 is provided, which serves to allow passengers to stow hand luggage and the like. Here, a plurality of upper air outlets 14 are arranged on the assembly and have, by way of example, a form which widens on a side directed towards the primary structure 26. A plurality of side air outlets 12 are arranged on an underside of the storage compartment assembly 32 at appropriate positions. The upper air outlets 14 and the side air outlets 12, in pairs, share a common air outlet connector 16 in each case. It is conceivable that the riser lines 18, when preassembling the ceiling module 30, are already attached to the air outlet connectors 16. They can hang down from the ceiling module 30 following the assembly of the latter, in order to then be connected to the supply air line connectors 8. For this purpose, they have a connector piece 19 at a free end shown in FIG. 1. The supply air line connectors 8 and the connection pieces 19 are designed in a manner complementary to one another.

Figure 3:
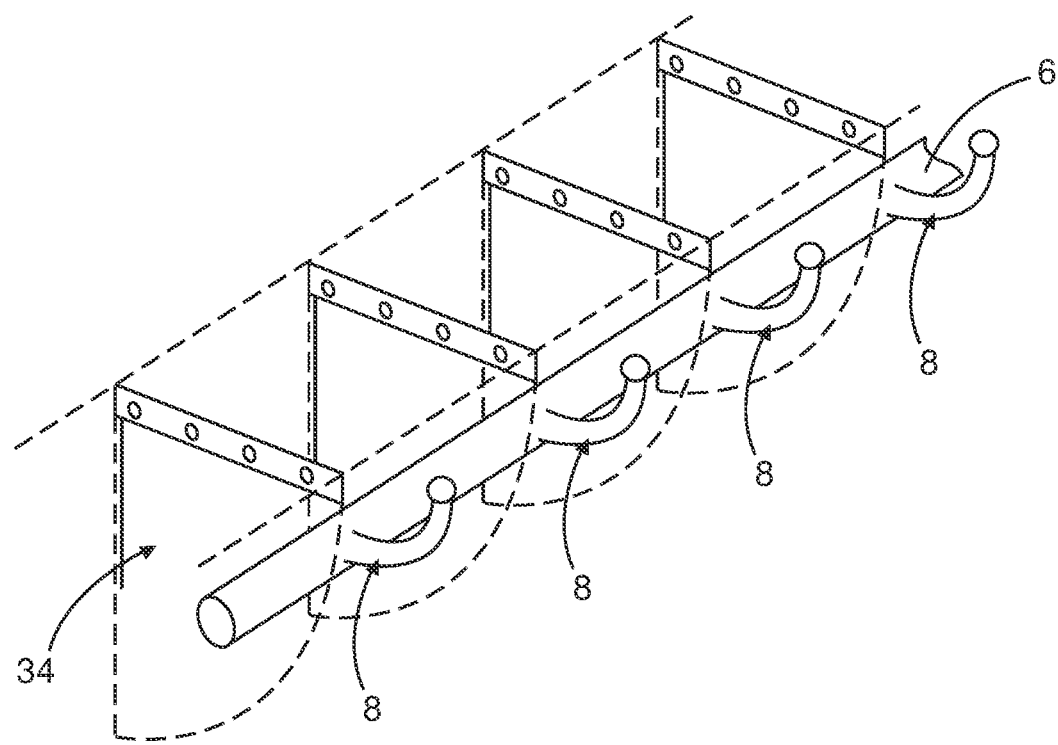
FIG. 3 shows a floor module.

FIG. 3 shows the supply air line 6 with a plurality of supply air line connectors 8. The supply air lines 6 and the supply air line connectors 8 can be arranged in a floor module 34, which can be installed, also preassembled, in the cabin 4. After the installation, the riser lines 18 can be connected to the supply air line connectors 8 and can be fixed by the retainers 28 by assembling the trim elements 20.

Figures 4A, 4B:
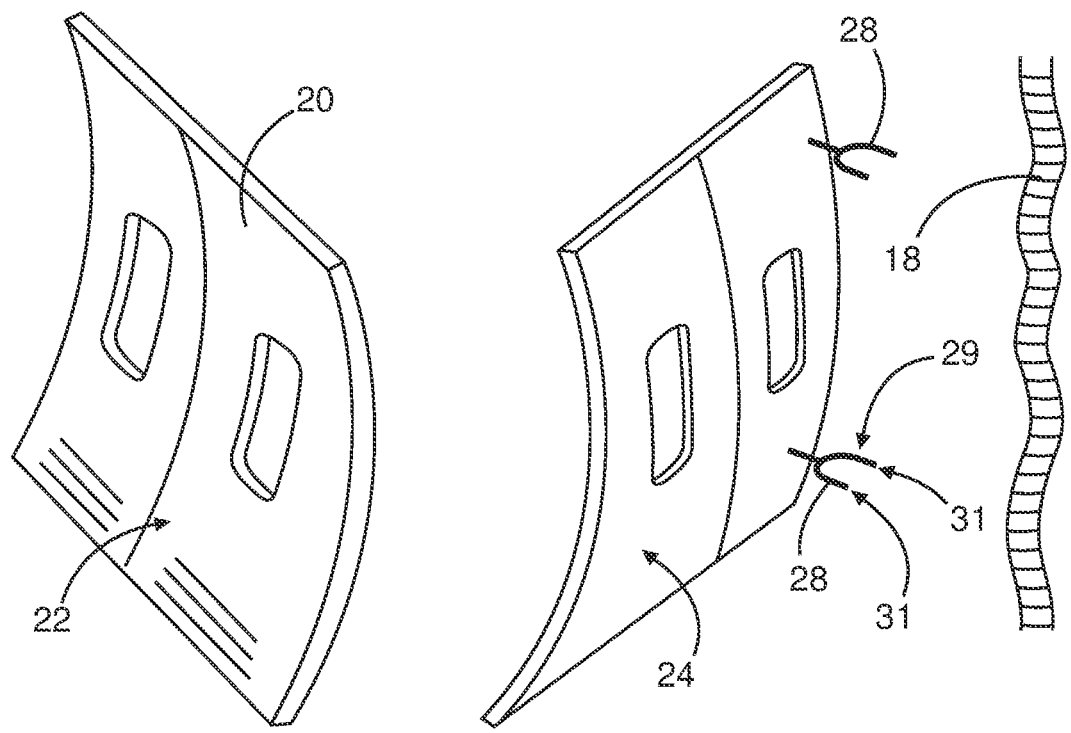
FIGS. 4A and 4B show a trim element from two different views.

FIGS. 4A and 4B show the trim element 20 in two different perspectives. The inner side 22 faces the passengers in the cabin 4 and provides an elegant, harmoniously shaped surface. The outer side 24 has retainers 28 for each riser line 18, which retainers are shown here by way of example as two retainers 28 which are spaced from one another vertically. By way of example, the retainers 28 each comprise a bracket element 29, which defines a contour corresponding substantially to an arc with an angle subtended by the arc of more than 180°. Consequently, the bracket element has two free ends 31, which are arranged at a distance from one another. By using an elastic material, the ends 31 can be moved away from one another. The riser line 18 could be engaged around by the bracket elements 31 over more than 180° so that it is held on the bracket elements. In this state, the ends 31 are urged resiliently towards one another.

The riser lines 18 could be fastened to the retainer 28 prior to the assembly of the trim element 20. However, they could also be pushed into the retainers 28 and thus fixed as a result of the fastening of the trim elements 20 themselves.

Figure 5:
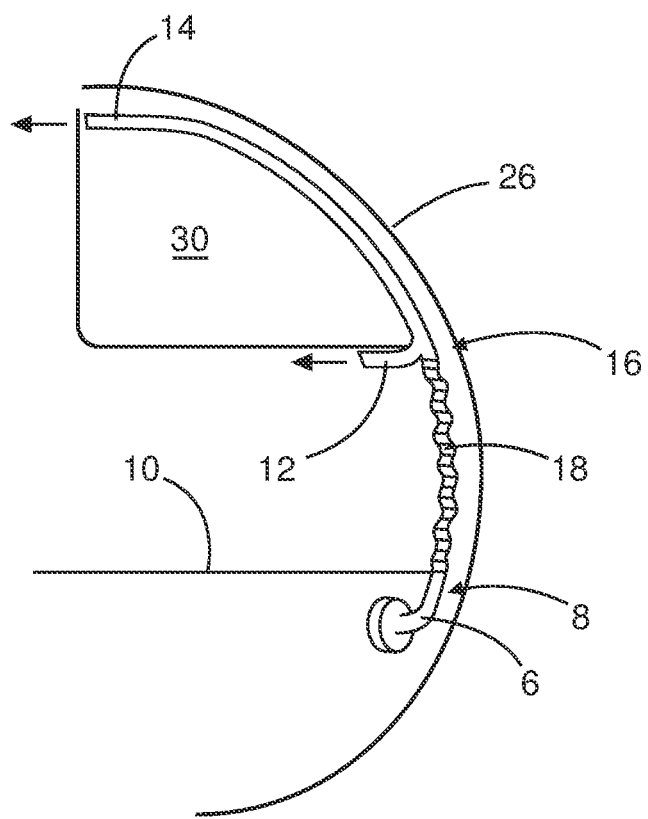
FIG. 5 shows the system from FIG. 1 without trim element for testing.

FIG. 5 shows the arrangement without trim element 20. The riser line 18 is connected to the supply air line connector 8 and the air outlet connector 16, but is not fixed. Following the assembly of the trim element 20, the riser line 18 would be fixed. The function of the air distribution system 2 could be tested in this state, however, in order to correct any faults. The riser lines 18 are still very easily accessible in this state along the entire cabin 4, since in particular they do not have to be fixed to the primary structure 26 in order to perform their function.

Figure 6:
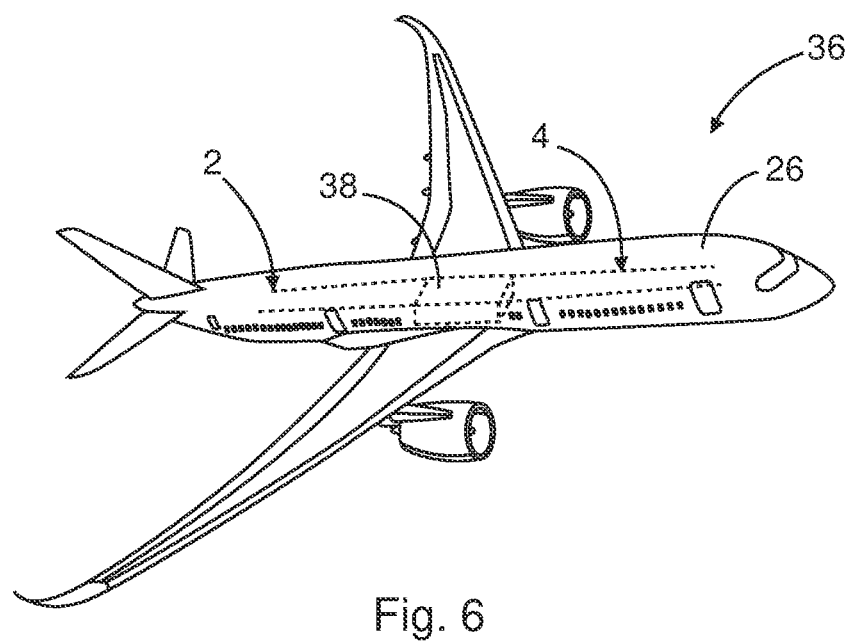
FIG. 6 shows an aircraft.

Lastly, FIG. 6 shows an aircraft 36 which comprises the primary structure 26 in which the cabin 4 is formed. The air distribution system 2 is arranged therein in accordance with the illustration above. The air distribution system can be coupled to an air-conditioning system 38 indicated by dashed lines.

It should additionally be noted that the term "comprising" does not rule out any other elements or steps and "a" or "an" does not rule out a plurality. It is also noted that features which have been described with reference to one of the above example embodiments can also be used in combination with other features from other above-described example embodiments. Reference signs in the claims are not considered to be limiting.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS 2 air distribution system
4 cabin
6 supply air line
8 supply air line connector
10 cabin floor
12 side air outlet
14 upper air outlet
16 air outlet connector
18 riser line
19 connection piece
20 trim element
22 inner side
24 outer side
26 primary structure
28 retainers
29 bracket element
30 ceiling module
31 end
32 storage compartment assembly
34 floor module
36 aircraft
38 air-conditioning system

The invention claimed is:

1. An air distribution system for a cabin of an aircraft, comprising:
   a supply air line with a supply air line connector;
   at least one air outlet with an air outlet connector;
   a riser line, which is connectable to the supply air line connector and the air outlet connector;
   a trim element to be arranged on a primary structure of the aircraft inside the cabin, the trim element comprising an inner side configured to be oriented toward the cabin of the aircraft and an outer side configured to be oriented toward the primary structure; and
   at least one retainer provided on the outer side of the trim element;
   wherein the riser line is flexible,
   wherein the at least one retainer is configured to be interlockingly connected to the riser line by being pressed against it, such that the riser line is fixed in place with respect to the trim element; and
   wherein the retainer is an active retainer which is configured, by application of a voltage, to assume an open state in which the riser line is no longer fixed.

2. The air distribution system of claim 1, wherein the riser line is configured as a hose, or as a spiral hose.

3. The air distribution system of claim 1, wherein the trim element is a wall panel for installation in an inter-former area of the cabin.

4. The air distribution system of claim 1, wherein the trim element comprises two or more retainers for a riser line, which are spaced from one another vertically.

5. The air distribution system of claim 1,
   wherein the retainer comprises at least one bracket element, which defines a contour corresponding substantially to an arc with an angle subtended by the arc of more than 180°, and
   wherein the bracket element is flexible such that, by pressing the bracket element onto the riser line, a cross section of the riser line is engaged over more than 180°.

6. The air distribution system of claim 1, wherein the riser line is connected to the air outlet connector and, at an end remote from the air outlet connector, comprises a connection piece which is connectable to the supply air line connector, which is formed in a complementary manner.

7. The air distribution system of claim 1, wherein the at least one air outlet is on a preassembled ceiling module for integration in the cabin.

8. The air distribution system of claim 1, wherein the supply air line is on a preassembled floor module for integration in the cabin.

9. An aircraft, comprising a primary structure, a cabin formed therein, an air-conditioning system installed in the aircraft and at least one air distribution system of claim 1.

10. The aircraft of claim 9, wherein the at least one air outlet is on a preassembled ceiling module for integration in the cabin and a plurality of the ceiling modules are arranged adjacently in a ceiling region of the cabin, and or
   wherein the supply air line is on a preassembled floor module for integration in the cabin and a plurality of the floor modules are arranged adjacently in or beneath a floor.

11. A method for fitting an air distribution system in a cabin of an aircraft, comprising:
   installing a supply air line having a supply air line connector;
   installing at least one air outlet having an air outlet connector;
   connecting a flexible riser line to the air outlet connector and the supply air line connector;
   attaching a trim element to a primary structure of the aircraft within the cabin, wherein the riser line is fixed interlockingly to an outer side of the trim element facing the primary structure by at least one retainer provided on the outer side of the trim element, wherein the at least one retainer comprises an active retainer which is configured to assume an open state in response to application of a voltage; and
   applying the voltage to the active retainer to selectively detach the retainer from the riser line.

12. The method of claim 10, wherein installing the supply air line comprises installing a floor module in or beneath a floor.

13. The method of claim 11, wherein installing the at least one air outlet comprises installing a ceiling module in a ceiling region.

14. An air distribution system for a cabin of an aircraft, comprising:
- a supply air line with a supply air line connector;
- at least one air outlet with an air outlet connector;
- a riser line, which is connectable to the supply air line connector and the air outlet connector; and
- a trim element to be arranged on a primary structure of the aircraft inside the cabin,
- wherein the riser line is flexible;
- wherein the trim element has an outer side which can be oriented relative to the primary structure and on which there is at least one retainer for retaining the riser line;
- wherein the at least one retainer is configured to be interlockingly connected to the riser line by being pressed against it, such that the riser line is fixed; and
- wherein the retainer is an active retainer which is configured, by application of a voltage, to assume an open state in which the riser line is no longer fixed.

\* \* \* \* \*